June 9, 1964
R. G. MARTZ
3,136,309
HEATER TERMINAL CONNECTIONS
Filed March 10, 1961
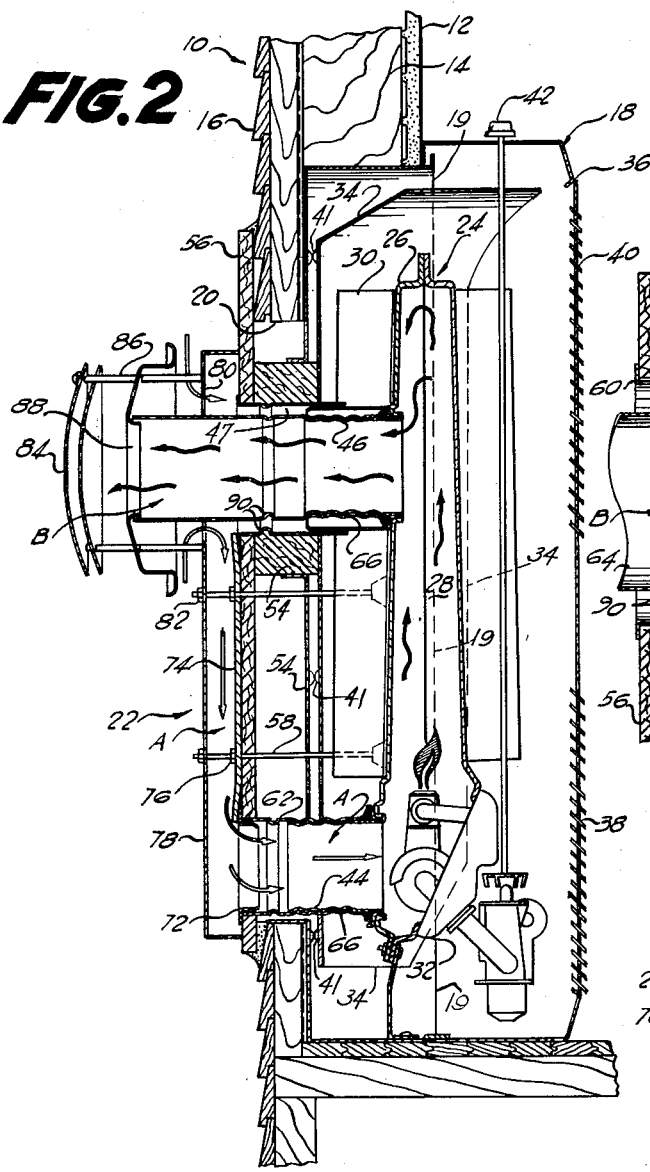
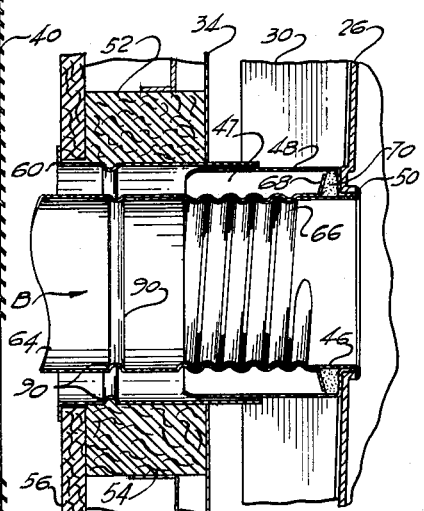
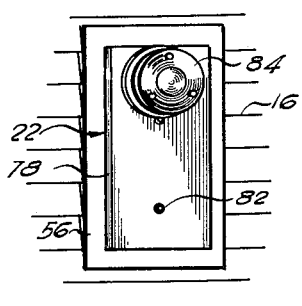
INVENTOR
Roger G. Martz
By A. G. Douras.
Attorney

United States Patent Office 3,136,309
Patented June 9, 1964

3,136,309
HEATER TERMINAL CONNECTIONS
Roger G. Martz, Lebanon, Ind., assignor to Stewart-Warner Corporation, Chicago, Ill., a corporation of Virginia
Filed Mar. 10, 1961, Ser. No. 94,909
3 Claims. (Cl. 126—85)

This invention relates to heater terminal connections. More particularly this invention relates to terminal connections of conduits used with enclosure heater units of a type commonly known as a sealed combustion system. A sealed combustion system heater unit derives all of its intake combustion air directly from, and discharges all its exhaust combustion products directly to atmospheric or outside air. The enclosure air is heated by heat transfer with the heater unit independently of the intake air and exhaust products. A heater unit of this type is disclosed in the patent to Allen W. Lundstrom, No. 2,160,883.

A sealed combustion system heater unit generally includes a burner sealed from the enclosure air in an air-tight combustion chamber assembly. The combustion chamber assembly is mounted on the interior side of an outside enclosure wall in heat exchange relationship with the enclosure air. Combustion air and exhaust products are communicated to and from the combustion chamber respectively, through passages defined in part by the above-mentioned conduits extending through openings in the enclosure wall to a venting device located in the outside air. The conduits, installed from the outside of the enclosure, are secured to the combustion chamber assembly by terminal connections that form the subject matter of this invention.

The sealed combustion system heater unit operates solely on natural draft caused by convection flow between the cool intake air and the hotter exhaust products. Deviation from the balanced convection flow not only hinders temperature controlling of the enclosure, but also greatly reduces the efficiency and dependability of the heater unit. Consequently, care must be taken to maintain the convection flow independent of ambient wind or other possible unbalancing factors. See, for example, the patent to Samuel I. Wendell, No. 2,755,794.

Imperfect sealing of the conduit terminal connections is one major factor causing convection flow unbalance. The reasons that the terminal connections are susceptible to imperfect sealing can be more fully appreciated upon a review of the problems involved both in their installation and after continued use.

Usually the terminal connections are located within the enclosure wall between the combustion chamber assembly and the venting device. They cannot be reached from inside the enclosure, since the combustion chamber assembly is in the way; nor can they be reached conveniently from outside the enclosure, since the clearance between the conduit and periphery of the enclosure wall opening is kept at a minimum. Visual inspection, therefore, is difficult if not impossible. Furthermore, the heater units are commonly installed by servicemen not familiar with the necessity of maintaining a sealed connection. A little haste during installation can result in an imperfect connection and the resulting waste.

Even after a good installation, factors caused by normal daily use can destroy the seal of the terminal connections used prior to this invention. Expansion and contraction of the conduits during intermittent use of the heater unit can cause axial forces on the mating conduits. Impacts against the heater unit or the venting device also can cause forces on the conduits. Without positive mechanical securing of the conduits to each other, axial forces such as these can cause relative displacement of the conduits to destroy the previously good seal.

Accordingly, an object of this invention is to provide an air-tight terminal connection for conduits defining a convection flow passage of a sealed combustion system heater unit.

Another object is to provide a terminal connection for conduits that is structurally rigid to prevent relative movement of the conduits.

Another object is to provide a terminal connection for conduits that may be reliably installed by a serviceman having average mechanic skills.

Another object is to provide a terminal connection for conduits that can be visually inspected after the installation.

These and other objects will be more fully appreciated after a complete disclosure of the invention included in the following specification and accompanying drawing forming a part thereof wherein:

FIG. 1 is an outside perspective view of a heater unit employing the conduit terminal connection of this invention;

FIG. 2 is an enlarged longitudinal vertical section view of the heater unit shown in FIG. 1; and FIG. 3 is an enlarged portion of FIG. 2.

Referring now to the drawings, and in particular FIG. 2, 10 represents an outside enclosure wall exposed on its opposite sides to atmospheric air and to the enclosure air. The enclosure wall 10 may be of any common construction such as brick, brick veneer, or frame. The wall shown in FIG. 2, however, is a conventional frame construction including the inside plaster or wallboard 12, studs 14, insulation (not shown), sheathing, and shingles 16.

A heating unit 18 is mounted on the inside of wall 10 within a sheet metal rough-in box 19 received in a recess between adjacent studs 14. An opening 20 cut through the wall 10 receives the conduits that provide the convection flow passages for the heater unit. The outside venting structure 22 is aligned with the opening 20 and secured to the heater unit 18. A represents the intake passage, while B represents the exhaust passage for the heater unit 18.

The heater unit 18 includes a combustion chamber assembly 24 having outside walls 26 sealed to each other to define a combustion chamber 28. The assembly 24 has appropriate heat transfer fins 30 and interior baffles (not shown). Burner 32 is secured to the assembly 24 by bolts (not shown). The burner flame is thus sealed from the enclosure air within the combustion chamber 28.

A sheet metal air case 34 surrounds the top, rear and two sides of the combustion chamber assembly 24 and is received within the rough-in box 19. Commonly the rough-in box 19 and air case 34 are secured together at spaced locations as, for example, by spot welding at 41. An indoor panel 36 fits over the combustion chamber assembly 24 and the air case 34. The panel 36 has a cool air louver 38 and hot air louver 40 through which the enclosure air is circulated between the panel 36 and air case 34 in heat exchange relationship with fins 30. A thermostat control knob 42 mounted on panel 36 can be used to regulate the burner 32, as is well known in the art.

Hollow tubes or inlet air conduit 44 and exhaust products conduit 46 are welded or otherwise secured to the assembly 24 and communicate with the combustion chamber 28 therein. It is generally advisable to insulate the hot exhaust passage B from the wall structure to avoid damage to the latter. Consequently, a second tube or conduit 48 (FIG. 3) is secured to the assembly 24 annularly of exhaust conduit 46 adapted to cooperate with sleeve 60 to be described to define a dead air space 47 therebetween. The tube 48 may be formed with an inturned lip portion so that the exhaust conduit 46 and tube 48 can be welded to the rear wall 26 with a single annular weld as at 50.

After the heater unit 18 is secured to the inside of the enclosure wall 10 as described, the remaining installation is performed from outside the enclosure. A fiberglass or other high temperature insulator 52 having an opening slightly larger than tube 48 is fitted over the end of tube 48 and supported within opening 54 in rough-in box 19. An insulating board 56 having openings therein aligned with tube 48 and conduit 44 is positioned against wall 10 to cover the opening 20 therein. Studs 58 projecting from the assembly 24 extend through small holes in insulating board 56 to hold the board in place.

Prior to this invention, bullet nose sleeves were extended through the openings in the insulating board 56 and had overlapping friction fits with the aligned conduits 44 and 46 therein. An asbestos rope gasket was received in a recess in the fixed conduit and compressed by the inserted bullet nose sleeve to establish the air-tight seal. The mating conduits and sleeves were held in place by the friction between the overlap. This invention eliminates the above-mentioned undesirable characteristics inherent in such connections.

Sleeve 60 having an internal dimension slightly larger than the external dimension of tube 48 is inserted through the upper opening in insulating board 56, the opening of insulator 52, and is adapted to fit snugly over tube 48. Furnace cement or other high temperature sealing compound is applied to the inside of sleeve 60 to seal the overlapping portion of the tube 48 and sleeve. Cement can also be applied to seal the sleeve 60 with the periphery of the upper opening in the insulating board 56.

The intake and exhaust passages, A and B, are formed in part by sleeves 62 and 64 mating with the conduits 44 and 46 respectively. The overlapping portions of the respective sleeve and conduit are provided with mating threads 66 formed by any conventional manner such as by rolling. Thus upon rotation of the installed sleeve (62 or 64), the sleeve is moved axially of its mating conduit. An upstanding flange 68 provided on the inner end of each sleeve is thus moved towards the base of the fixed conduit. Annular asbestos or other high temperature sealing gasket 70 is disposed around the fixed conduit and compressed by the upstanding flange 68 against the unit 18. Thus a positive seal is obtained between the installed sleeves 62 and 64 and the fixed conduits 44 and 46.

The inlet sleeve 62 can be modified slightly since the upstanding flange 68 at its inner end could be too large to fit through the opening in the insulating board 56. Accordingly, the sleeve 62 may be installed before the insulating board 56 is secured in place. The insulating board 56 thus is inserted over the already installed sleeve 62. A flanged bullet nose rim 72 then fits within sleeve 62 and overlaps the opening in the insulating board 56. However, if desired, the upstanding flange 68 and the asbestos gasket 70 at the inner end of the sleeve 62 may be eliminated and the rim 72 made integral with sleeve 62. The seal provided by the overlapping threaded portions supplemented by application of sealing cement therebetween would be sufficient.

Bar 74 secured by nuts 76 threaded onto studs 58 holds the insulating board 56 in place. The bar 74 can also extend over the ends of sleeves 64 and 72 to maintain the sleeves flush with the insulating board.

A cover plate 78 similar in shape to the top of a shoe box and having an opening 80 therein aligned with but larger than sleeve 64 is positioned against insulating board 56. Nuts 82 threaded onto studs 58 secure the cover plate 78 in place. A generally hat-shaped venting device 84 is secured by through-bolts 86 to the cover plate 78 in alignment with sleeve 64. Flange 88 on the venting device 84 receives the sleeve 64 and can be sealed by application of the proper sealing compound. The venting device 84 can be specially designed (see above-mentioned Wendell Patent No. 2,755,794) to maintain pressure differences between the heater intake and exhaust gases independent of atmospheric conditions.

To prevent infiltration of moisture into the dead air space or into the flow passages themselves, rain stop 90 is rolled in each sleeve to form an annular recess on one side and an annular projection on the other side of the sleeve. The flow of water droplets along the sleeve is prevented by the rain stop. Thus moisture is permitted only at the outer end of the sleeve subject to rapid evaporation.

An insulating serviceman can readily ensure an airtight seal between the fixed and installed conduits by rotating the installed conduit until it bottoms, the interposed gasket 70 being compressed between the flange 68 and heater unit 18.

Also, since the refractory cement can be applied on the inside of sleeve 60 to seal sleeve 60 and tube 48, as heretofore mentioned, the cement will not be brushed off upon installation of the sleeve 60. Both that seal (between sleeve 60 and tube 48) and the gasket 70 can be visually inspected by looking along the dead air space 47.

It is thus seen that the improved conduit terminal connection not only provides an easily installed reliable airtight seal between the mating conduits but also mechanically secures them relative to one another.

The embodiments shown are provided with two conduits extending through the wall 10 to define the inlet passage A and the exhaust passage B. Heaters of this type, however, sometimes employ an intake air passage which communicates with the atmospheric air by a passage annularly of the exhaust passage and to the heater unit by a passage located between the wall 10 and the heater unit. See for example the above-mentioned Wendell Patent No. 2,755,794. This invention is also readily adaptable for such an arrangement.

While a particular embodiment has been illustrated, other embodiments may be employed within the true spirit of this invention. It is desired, therefore, the invention not be limited by the specific embodiment shown but by the appended claims.

What is claimed is:

1. In an enclosure heater unit of the type having a combustion chamber assembly in heat exchange relationship with the enclosure air, and a combustion products discharge passage communicating the combustion chamber with the outside air, an improved terminal connection associated with the passage, comprising a conduit secured to the unit and communicating in sealed relationship with the combustion chamber, a tube on the unit adjacent the conduit and defining an annular recess therebetween, a sleeve adapted to be received over the conduit and having an annular upstanding flange receivable in the recess, a sealing element in the recess between the flange and unit, mating threaded portions on the conduit and sleeve operable to displace the sleeve axially of the conduit to compress the sealing element by and between the flange and the unit and restrained between the conduit and tube, and a second sleeve annularly of the first-mentioned sleeve and matable over the tube.

2. In an enclosure heater unit including a burner sealed from the enclosure air within a combustion chamber assembly, the combustion chamber assembly being mounted on the inside of the enclosure wall in heat exchange relationship with the enclosure air and having at least one conduit communicating at one end with the combustion chamber therein and terminating at the other end within a through-opening in the enclosure wall, and a sleeve aligned with the conduit within the through-opening and extending to outside of the enclosure to define a fluid communicating passage between the combustion chamber and the outside air, an improved terminal connection between the sleeve and the conduit, comprising a tube secured to the combustion chamber assembly annularly of the conduit and presenting an annular recess therebetween, an upstanding annular flange on the end of the sleeve adjacent the assembly receivable within the recess, mating threaded portions on the sleeve and the conduit operable upon relative rotation thereof to displace the sleeve axially of the conduit, a sealing element disposed in the recess between the flange and the assembly and compressible therebetween and confined radially by the tube and the conduit, and a second sleeve receivable over the tube annularly of the first-mentioned sleeve and abutting the periphery of the wall opening.

3. A sealed combustion heater for an enclosure, comprising in combination, a combustion heater unit including outer structure defining a sealed combustion chamber, inlet and outlet means for the chamber including, respectively, inlet and outlet conduit members secured to the structure and communicating with the chamber, said structure being adapted to be mounted on the inside of a wall of the enclosure and having at least the outlet conduit member extending to within a through-opening in said enclosure wall, inlet and outlet sleeve members adapted to be positioned from outside of the enclosure into the through-opening for communicating with the respective conduit, at least the outlet conduit and sleeve members having complementary threaded means operable to interconnect the members securely, a vent adapted to be mounted on the outside of the enclosure wall in general alignment with the outlet sleeve member, said vent being operable to complete inlet and outlet passageways between the combustion chamber and the air outside the enclosure and including at least in part the inlet and outlet means, a tube member secured to the heater structure over the outlet conduit member and defining an annular recess therebetween, a second sleeve member adapted to be inserted from outside of the enclosure into the through-opening and to overlap snugly the tube member, thereby establishing a generally dead air space annularly from the outlet passageway, an annular upstanding flange on the end of at least the outlet sleeve member adjacent the heater structure adapted to be received in said recess, and an annular resilient sealing member received in said recess over said outlet conduit member compressible by and between said flange and heater structure and confined radially between the outlet conduit member and the tube member.

References Cited in the file of this patent

UNITED STATES PATENTS

| | | |
|---|---|---|
| 721,114 | West | Feb. 17, 1903 |
| 872,331 | Dreier | Dec. 3, 1907 |
| 906,870 | Grabel | Dec. 15, 1908 |
| 1,369,390 | Bruns | Feb. 22, 1921 |
| 2,588,496 | Dollinger | Mar. 11, 1952 |
| 2,632,435 | Lundstrum | Mar. 24, 1953 |

FOREIGN PATENTS

| | | |
|---|---|---|
| 210,117 | Austria | July 11, 1960 |
| 725,988 | Great Britain | Mar. 16, 1955 |